(12) United States Patent
Knott et al.

(10) Patent No.: US 11,286,366 B2
(45) Date of Patent: Mar. 29, 2022

(54) PROCESS FOR RECYCLING SILICONES

(71) Applicant: Evonik Operations GmbH, Essen (DE)

(72) Inventors: Wilfried Knott, Essen (DE); Horst Dudzik, Essen (DE); Dietmar Schaefer, Hattingen (DE)

(73) Assignee: Evonik Operations GmbH, Essen (DE)

( * ) Notice: Subject to any disclaimer, the term of this patent is extended or adjusted under 35 U.S.C. 154(b) by 28 days.

(21) Appl. No.: 16/849,181

(22) Filed: Apr. 15, 2020

(65) Prior Publication Data

US 2020/0377686 A1 Dec. 3, 2020

(30) Foreign Application Priority Data

May 28, 2019 (EP) .................................... 19176869

(51) Int. Cl.
*C08J 11/26* (2006.01)

(52) U.S. Cl.
CPC ............ *C08J 11/26* (2013.01); *C08J 2383/04* (2013.01)

(58) Field of Classification Search
USPC ..... 521/43, 43.5; 528/26, 28, 29, 30, 31, 34, 528/38
See application file for complete search history.

(56) References Cited

U.S. PATENT DOCUMENTS

| | | | |
|---|---|---|---|
| 4,276,425 A | 6/1981 | Burkhardt et al. |
| 4,328,353 A | 5/1982 | Shah |
| 5,110,972 A | 5/1992 | Greenlee |
| 6,172,253 B1 | 1/2001 | Kawamoto |
| 6,521,771 B2 | 2/2003 | Frommeyer et al. |
| 6,659,162 B2 | 12/2003 | Frommeyer et al. |
| 6,854,506 B2 | 2/2005 | Knott et al. |
| 6,858,663 B2 | 2/2005 | Knott et al. |
| 6,874,562 B2 | 4/2005 | Knott et al. |
| 6,915,834 B2 | 7/2005 | Knott et al. |
| 6,942,716 B2 | 9/2005 | Knott et al. |
| 7,125,585 B2 | 10/2006 | Dudzik et al. |
| 7,196,153 B2 | 3/2007 | Burkhart et al. |
| 7,598,334 B2 | 10/2009 | Ferenz et al. |
| 7,612,158 B2 | 11/2009 | Burkhart et al. |
| 7,612,159 B2 | 11/2009 | Burkhart et al. |
| 7,619,035 B2 | 11/2009 | Henning et al. |
| 7,645,848 B2 | 1/2010 | Knott et al. |
| 7,754,778 B2 | 7/2010 | Knott et al. |
| 7,825,205 B2 | 11/2010 | Knott et al. |
| 7,825,206 B2 | 11/2010 | Neumann et al. |
| 7,825,209 B2 | 11/2010 | Knott et al. |
| 7,838,603 B2 | 11/2010 | Schwab et al. |
| 8,138,294 B2 | 3/2012 | Henning et al. |
| 8,247,525 B2 | 8/2012 | Schubert et al. |
| 8,268,939 B2 | 9/2012 | Ebbrecht et al. |
| 8,283,422 B2 | 10/2012 | Schubert et al. |
| 8,309,664 B2 | 11/2012 | Knott et al. |
| 8,309,673 B2 | 11/2012 | Schubert et al. |
| 8,324,325 B2 | 12/2012 | Knott et al. |
| 8,334,355 B2 | 12/2012 | Henning et al. |
| 8,349,907 B2 | 1/2013 | Henning et al. |
| 8,420,748 B2 | 4/2013 | Henning et al. |
| 8,450,514 B2 | 5/2013 | Schubert et al. |
| 8,455,603 B2 | 6/2013 | Ferenz et al. |
| 8,557,944 B2 | 10/2013 | Henning et al. |
| 8,598,295 B2 | 12/2013 | Henning et al. |
| 8,609,798 B2 | 12/2013 | Knott et al. |
| 8,623,984 B2 | 1/2014 | Henning et al. |
| 8,722,834 B2 | 5/2014 | Knott et al. |
| 8,722,836 B2 | 5/2014 | Knott et al. |
| 8,729,207 B2 | 5/2014 | Hartung et al. |
| 8,772,423 B2 | 7/2014 | De Gans et al. |
| 8,778,319 B2 | 7/2014 | Herrwerth et al. |
| 8,779,079 B2 | 7/2014 | Henning et al. |
| 8,796,198 B2 | 8/2014 | Henning et al. |
| 8,802,744 B2 | 8/2014 | Knott et al. |
| 8,841,400 B2 | 9/2014 | Henning et al. |
| 8,921,437 B2 | 12/2014 | Knott et al. |
| 8,946,369 B2 | 2/2015 | Henning et al. |
| 8,957,009 B2 | 2/2015 | Schubert et al. |
| 8,969,502 B2 | 3/2015 | Knott et al. |

(Continued)

FOREIGN PATENT DOCUMENTS

| | | |
|---|---|---|
| CN | 103 936 784 A | 7/2014 |
| CN | 109 400 951 A | 3/2019 |

(Continued)

OTHER PUBLICATIONS

Stephan Enthaler et al. ,Iron-Catalyzed Depolymerization of Polysiloxanes to ProduceDichlorodimethylsilane, Diacetoxydimethylsilane,or Dimethoxydimethylsilane Department of Chemistry, Technische Universit€at Berlin, Cluster of Excellence "Unifying Concepts in Catalysis", (Year: 2014).*

(Continued)

*Primary Examiner* — Terressa Boykin
(74) *Attorney, Agent, or Firm* — Taylor English Duma LLP; Philip P. McCann

(57) ABSTRACT

A process for the recycling of silicones, especially silicone rubber and/or silicone oils, by the chemical transformation thereof to silanes and/or siloxanes having acetoxy groups is described, wherein silicone rubber and/or silicone oils are subjected to a heat treatment in digestion systems comprising acetic anhydride and/or acetoxysiloxane, and at least one Brønsted acid, with addition of acetic acid.

20 Claims, No Drawings

(56) References Cited

U.S. PATENT DOCUMENTS

| | | |
|---|---|---|
| 8,974,627 B2 | 3/2015 | Schubert et al. |
| 8,993,706 B2 | 3/2015 | Schubert et al. |
| 9,005,361 B2 | 4/2015 | Henning et al. |
| 9,035,011 B2 | 5/2015 | Ferenz et al. |
| 9,068,044 B2 | 6/2015 | Schubert et al. |
| 9,115,335 B2 | 8/2015 | Trosin et al. |
| 9,315,614 B2 | 4/2016 | Schubert et al. |
| 9,334,354 B2 | 5/2016 | Ferenz et al. |
| 9,353,225 B2 | 5/2016 | Knott et al. |
| 9,481,695 B2 | 11/2016 | Knott et al. |
| 9,540,500 B2 | 1/2017 | Ferenz et al. |
| 9,695,202 B2 | 7/2017 | Henning et al. |
| 9,738,797 B2 | 8/2017 | Niewski et al. |
| 9,783,635 B2 | 10/2017 | Schubert et al. |
| 9,783,656 B2 | 10/2017 | Lehmann et al. |
| 9,845,391 B2 | 12/2017 | Lehmann et al. |
| 9,868,699 B2 | 1/2018 | Nitz et al. |
| 9,878,979 B2 | 1/2018 | Nitz et al. |
| 9,896,541 B2 | 2/2018 | Fiedel et al. |
| 9,975,909 B2 | 5/2018 | Schubert et al. |
| 10,010,838 B2 | 7/2018 | Favresse et al. |
| 10,087,278 B2 | 10/2018 | Fiedel et al. |
| 10,093,605 B2 | 10/2018 | Bajus et al. |
| 10,099,211 B2 | 10/2018 | Knott et al. |
| 10,106,649 B2 | 10/2018 | Fiedel et al. |
| 10,266,658 B2 | 4/2019 | Henning et al. |
| 10,392,340 B2 | 8/2019 | Rittsteiger et al. |
| 10,399,051 B2 | 9/2019 | Favresse et al. |
| 10,399,998 B2 | 9/2019 | Knott et al. |
| 10,407,592 B2 | 9/2019 | Amajjahe et al. |
| 10,414,871 B2 | 9/2019 | Knott et al. |
| 10,414,872 B2 | 9/2019 | Knott et al. |
| 10,519,280 B2 | 12/2019 | Knott et al. |
| 10,526,454 B2 | 1/2020 | Knott et al. |
| 10,544,267 B2 | 1/2020 | Knott et al. |
| 10,577,512 B2 | 3/2020 | Aitha et al. |
| 10,752,735 B2 | 8/2020 | Knott et al. |
| 10,766,913 B2 | 9/2020 | Knott et al. |
| 10,787,464 B2 | 9/2020 | Fiedel et al. |
| 10,836,867 B2 | 11/2020 | Knott |
| 10,954,344 B2 | 3/2021 | Knott et al. |
| 11,021,575 B2 | 6/2021 | Knott et al. |
| 11,066,429 B2 | 7/2021 | Knott et al. |
| 2002/0161158 A1 | 10/2002 | Burkhart et al. |
| 2007/0128143 A1 | 6/2007 | Gruning et al. |
| 2008/0125503 A1 | 5/2008 | Henning et al. |
| 2009/0137752 A1 | 5/2009 | Knott et al. |
| 2010/0022435 A1 | 1/2010 | Henning et al. |
| 2010/0029587 A1 | 2/2010 | Brueckner et al. |
| 2010/0081781 A1 | 4/2010 | Schubert et al. |
| 2011/0144269 A1 | 6/2011 | Kuppert et al. |
| 2011/0230619 A1 | 9/2011 | Kuppert et al. |
| 2011/0301254 A1 | 12/2011 | Knott et al. |
| 2011/0306694 A1 | 12/2011 | Glos et al. |
| 2012/0037036 A1 | 2/2012 | Veit et al. |
| 2012/0068110 A1 | 3/2012 | Schubert et al. |
| 2012/0190760 A1 | 7/2012 | Henning et al. |
| 2012/0190762 A1 | 7/2012 | Hubel et al. |
| 2012/0282210 A1 | 11/2012 | Henning et al. |
| 2013/0041115 A1 | 2/2013 | Knott et al. |
| 2013/0213267 A1 | 8/2013 | Fiedel et al. |
| 2013/0259821 A1 | 10/2013 | Henning et al. |
| 2013/0345318 A1 | 12/2013 | Schubert et al. |
| 2014/0256844 A1 | 9/2014 | Henning et al. |
| 2014/0309446 A1 | 10/2014 | Amajjahe et al. |
| 2015/0004112 A1 | 1/2015 | Ritter et al. |
| 2015/0004113 A1 | 1/2015 | Ritter et al. |
| 2016/0130402 A1 | 5/2016 | Schubert et al. |
| 2017/0198099 A1 | 7/2017 | Knott |
| 2018/0016392 A1 | 1/2018 | Lobert et al. |
| 2018/0106369 A1 | 4/2018 | Ichikawa et al. |
| 2018/0155264 A1 | 6/2018 | Bajus et al. |
| 2018/0258228 A1 | 9/2018 | Amajjahe et al. |
| 2018/0305596 A1 | 10/2018 | Schubert et al. |
| 2019/0031880 A1 | 1/2019 | Cavaleiro et al. |
| 2019/0100625 A1 | 4/2019 | Knott et al. |
| 2019/0106369 A1 | 4/2019 | Schubert et al. |
| 2019/0106441 A1 | 4/2019 | Knott et al. |
| 2019/0112502 A1 | 4/2019 | Sloot et al. |
| 2019/0194488 A1 | 6/2019 | Favresse et al. |
| 2019/0345101 A1 | 11/2019 | Cameretti et al. |
| 2020/0055991 A1 | 2/2020 | Knott et al. |
| 2020/0055992 A1 | 2/2020 | Knott et al. |
| 2020/0216474 A1 | 7/2020 | Fiedel et al. |
| 2020/0339612 A1 | 10/2020 | Knott et al. |
| 2020/0377524 A1 | 12/2020 | Knott et al. |
| 2020/0377525 A1 | 12/2020 | Knott et al. |
| 2020/0377660 A1 | 12/2020 | Knott et al. |
| 2020/0377665 A1 | 12/2020 | Knott et al. |
| 2020/0377666 A1 | 12/2020 | Knott et al. |
| 2020/0377684 A1 | 12/2020 | Hermann et al. |
| 2020/0385528 A1 | 12/2020 | Knott |
| 2021/0130551 A1 | 5/2021 | Knott et al. |
| 2021/0163687 A1 | 6/2021 | Knott et al. |
| 2021/0171719 A1 | 6/2021 | Knott et al. |
| 2021/0253780 A1 | 8/2021 | Wessely et al. |
| 2021/0253799 A1 | 8/2021 | Knott et al. |
| 2021/0301099 A1 | 9/2021 | Knott et al. |
| 2021/0371598 A1 | 12/2021 | Knott et al. |

FOREIGN PATENT DOCUMENTS

| | | |
|---|---|---|
| DE | 195 02 393 A1 | 8/1996 |
| EP | 1057855 A1 | 12/2000 |
| WO | 02/060621 A2 | 8/2002 |
| WO | 02/094483 A2 | 11/2002 |
| WO | 2008/074564 A2 | 6/2008 |
| WO | 2010/046181 A2 | 4/2010 |
| WO | 2018/118926 A2 | 10/2010 |
| WO | 2013/010747 A1 | 1/2013 |
| WO | 2013/017365 A1 | 2/2013 |
| WO | 2014/130948 A1 | 8/2014 |
| WO | 2015/003875 A1 | 1/2015 |
| WO | 2018/001889 A1 | 1/2018 |
| WO | 2019/076552 A1 | 4/2019 |
| WO | 2019/105608 A1 | 6/2019 |
| WO | 2019/192876 A1 | 10/2019 |
| WO | 2019/219446 A1 | 11/2019 |
| WO | 2019/219452 A1 | 11/2019 |

OTHER PUBLICATIONS

Fiedel et al., U.S. Appl. No. 16/648,345, filed Mar. 18, 2020.
Enthaler, "Iron-catalyzed depolymerization of polysiloxanes to produce dichlorodimethylsilane, diacetoxydimethylsilane, or dimethoxydimethylsilane," copyright Jan. 2015, Journal of Applied Polymer Science, Bd. 132, Nr. 3 (8 pages).
European Search Report dated Dec. 2, 2019 in EP 19176869.6 (6 pages).
Knott et al., U.S. Appl. No. 17/239,011, filed Apr. 23, 2021.
Knott et al., U.S. Appl. No. 17/297,372, filed May 26, 2021.
Knott et al., U.S. Appl. No. 17/476,417, filed Sep. 15, 2021.

\* cited by examiner

PROCESS FOR RECYCLING SILICONES

CROSS REFERENCE TO RELATED APPLICATIONS

This application is a 35 U.S.C. § 119 patent application which claims the benefit of European Application No. 19176869.6 filed May 28, 2019, which is incorporated herein by reference in its entirety.

FIELD

The invention is in the field of the silicones; more particularly, it relates to a process for recycling silicones, preferably silicone rubber and silicone oils, by chemical transformation thereof to silanes and/or siloxanes having acetoxy groups, and to a process for conversion thereof to silanes and/or siloxanes bearing alkoxy groups, and to a process for converting the silanes and/or siloxanes having acetoxy groups to silanes and/or siloxanes bearing hydroxyl groups.

BACKGROUND

Owing to their specific material characteristics, silicone components fulfil particular demands from a medical, pharmaceutical and food technology point of view. They are physiologically entirely inert given appropriate processing. For instance, products made of silicone are encountered in food applications, in medicine and in pharmaceutical sectors. Babies' dummies and pacifiers are produced from silicone, as are divers' goggles. In technical industrial applications, silicone appears in many cases as a material for gaskets or in dynamic applications for membranes. In the automotive sector, it is used for hoses, sheaths or as cable insulation.

With regard to its mechanical properties, silicone has a crucial advantage over other rubber types. In the case of silicone, they are conserved at a relatively stable level over a very wide temperature range, whereas the mechanical properties of many other materials deteriorate significantly under cold or hot conditions. While a look at the technical data sheet for EPDM material, for example, suggests that it is superior to a silicone mixture in terms of its mechanical properties because the properties at room temperature are reported here, exactly the opposite picture is found at high or low temperatures. Thermal stability in air for silicone is from about −80° C. to about 250° C. This property is extensively used for gaskets since the very low compression set which is typical of silicone is manifested here.

Owing to their excellent ozone, UV and weathering stability, mixtures of silicone are additionally frequently used in outdoor applications. Furthermore, silicone has very low flammability and has both good electrical insulation capacity and good electrical conductivity. Silicone is chemically stable, for instance, with respect to vegetable and animal fats, hot water and alcohol. Stability is limited with respect to acids, alkalis, fuels and ketones, and also water vapor. Silicone additionally has very high gas permeability.

As well as industrial applications, silicone has been used for decades as a preferred elastomer in the medical sector. Silicone components are also used as short-term implants (for less than 30 days in class IIa medical products) or long-term implants (for 30 days or more in class IIb medical products), where they fulfil critical functions in devices such as heart catheters, heart pacemakers, ventilation devices, neurostimulators and defibrillators.

Silicone rubber which is to be used for long-term implants is supplied only by very few producers globally (for example by NuSil Technology). The mixtures are produced under strict regulations issued by the U.S. Food and Drug Administration (FDA). Even in the course of processing, exceptional purity has to be ensured, and component production must take place in a cleanroom.

An important advantage of silicone here is that it is biocompatible and hence is well tolerated by man. The biocompatibility of a silicone mixture is frequently shown by USP Class VI classifications (USP stands for United States Pharmacopeia) or by tests according to the stricter (DIN EN) ISO 10993 standard. (DIN EN) ISO 10993 serves in particular for testing of medical products that are implanted for a long period or permanently in the human body. For shorter applications, classification according to USP Class VI or possibly a lower classification is sufficient.

Furthermore, silicone, owing to its property of being usable within a wide temperature range from about −80° C. to about 250° C., offers the option of steam sterilization (heating in an autoclave). Silicone products can thus be freed of living microorganisms, their dormant forms, viruses, etc. The good electrical insulation properties of silicone are also of particular significance in the medical sector.

By variation of the silicone rubbers used and the modes of crosslinking, silicones can take on particular properties. For instance, HTV silicone rubbers are flexible and stable within a wide temperature range from −50° C. up to 200° C., in some cases up to 300° C. They are encountered in gaskets in the automotive or food industry, in cable sheaths or as insulation material.

RTV silicone rubbers are valued particularly for their thermal conductivity and electrical insulation capacity, and for that reason they are preferably used in the electrical and electronics sector.

Liquid silicones (also LSRs, liquid silicone rubbers) have a lower viscosity compared to the HTV and RTV silicone rubbers. They can be converted to a wide variety of different forms by injection moulding and be processed, for example, to give silicone hoses. Since LSR silicones are always produced with platinum crosslinking, products based on liquid silicones can be used in medical technology sectors.

Owing to its high stability within the human body, silicone thus constitutes very good protection of critical components and is additionally used with preference for functional parts owing to the properties mentioned.

In principle, silicone rubber differs by comparison with other organic elastomers in that its main chains having an inorganic structure do not consist of carbon compounds but are formed from combinations of silicon and oxygen atoms, with use of fumed silica in particular as filler for development of good properties.

In accordance with their states of matter and their vulcanization temperatures, silicone rubbers can be divided into three groups:

Silicone rubbers referred to as HTV (high temperature vulcanizing) or HCR (high consistency rubber) are those having a solid raw material. They are vulcanized at high temperatures typically between 140° C. and 200° C. Crosslinking is effected by peroxides or by addition reaction, with use of platinum compounds as catalyst.

Liquid silicone or LSR (liquid silicone rubber) as raw material is a (viscous) fluid and consists of two components that are mixed directly prior to processing. Crosslinking is effected by addition reaction at similar temperatures to those for the HTV types, generally with significantly faster crosslinking.

Both silicone types can be colored. Finished elastomer articles made from HTV silicone and LSR silicone barely differ in their properties.

The third group is that of what are called RTV (room temperature vulcanizing) silicones. In the case of these, crosslinking already occurs at room temperature. They are extensively used as sealing compound or in prototype manufacture. They are available both as one-component and as two-component systems.

As advantageous as the use properties derivable from the exceptional chemical stability of the silicones are for the service life of the articles manufactured therefrom, the stability thereof is troublesome in the disposal of the silicones at the end of their life cycle.

Material utilization of silicone rubbers is possible to a very limited degree, for example by mechanically comminuting used materials consisting of silicone rubber and adding the comminuted material thus obtained as filler material to new silicone rubber compounds that are yet to be cured. The transport of the silicone wastes to suitable landfills and landfilling therein incurs considerable costs. In an ever intensifying environmental debate, their natural non-degradability or difficulty of degradability is additionally putting silicones in an unfavorable light from a sustainability point of view.

Energetic utilization which, in the case of purely hydrocarbon-based polymers, for example in the case of polyethylene and polypropylene via combustion, is an option for converting these polymers to thermal energy with release of carbon dioxide and water is not a viable option for silicones since the combustion thereof gives rise to huge amounts of finely divided silicon dioxide that cause even greater technical problems. On the other hand, according to information from ECO U.S.A., the recycling of 1 metric ton of silicone rubber saves 5774 kWh of energy, 16.3 barrels of oil and 98 million BTU of energy.

Aside from the material and energetic utilization of silicone wastes, the technical problem addressed is thus defined as that of providing an environmentally viable and simultaneously economically attractive physical recycling process for all kinds of silicones that permits avoidance of landfilling thereof and feeding of the silicone materials back into value-creating, novel silicone-based streams of matter. Furthermore, the process sought should also be applicable to silicone oils.

U.S. Pat. No. 5,110,972 is dedicated to the physical reutilization of used silicone by dissolution of the silicone waste in a suitable solvent by converting the waste to dimethylsiloxane cycles such as $D_3$, $D_4$, $D_5$ and so forth by use of a two-stage acid/base-catalysed cleavage process. The silicone waste used therein consists of liquids or elastomeric materials of high molecular weight, particularly solids that are formed by a silicone polymer that typically bears short alkyl groups, especially methyl groups. Silicone cycles are thus obtained by distillation in high yields.

Japanese published specification Heisei 9-176364 proposes a process in which silicone resins are broken down under the action of orthocarboxylic esters and compounds having active hydrogen-containing groups and catalysts to recyclable siloxane monomers or oligomers. It is a disadvantage of the process performable under relatively mild and inexpensive conditions which is described therein that it is unavoidably afflicted by unwanted by-products originating from the hydrolysis of the orthocarboxylic esters, for example methyl formate if methyl orthoformate is used as orthocarboxylic ester. Because it is not possible to use monomers or oligomers containing the orthocarboxylic ester directly, i.e. as obtained, there is a need for further workup thereof, for example as described in Japanese published specification Heisei 9-7779. In view of these difficulties and of the complexity involved, the process has not become part of industrial practice.

In view of these Japanese publications, U.S. Pat. No. 6,172,253 B1 is likewise concerned with the physical reutilization of siloxane-containing materials, i.e. those having Si—O—Si bonds, by breaking these down with alkyl carbonates and compounds containing active hydrogen and in the presence of a catalyst to form a great multitude of silicone monomers and/or silicone oligomers (more than 200 different examples in the product mixture).

A silicone rubber which, following this teaching, has been treated at 90° C. under reflux conditions in a mixture of dimethyl carbonate and methanol with addition of sulfuric acid for 4 hours leads to a highly varied substance mixture comprising more than 200 different compounds, including dimethoxydimethylsilane.

The non-selectivity of the otherwise mild digestion process makes it unattractive since any reuse of the matter coming from the breakdown reaction first requires passage through a complex thermal separation process.

EP 1057855 A1 teaches a digestion process for cross-linked silicone wastes, wherein they are hydrolysed by reacting them with a solvent containing hydroxyl groups, such as methanol, ethanol or isopropanol, under supercritical conditions. What are obtained here are non-crosslinked, non-functional silicone compounds (=silicone oils), as shown by the infrared spectra included therein. The necessity of observing supercritical pressure conditions requires utilization of pressure-rated apparatuses, which makes the process costly on an industrial scale.

Enthaler et al. are concerned with the iron-catalysed depolymerization of polysiloxanes for preparation of dichlorodimethylsilane, diacetoxydimethylsilane and dimethoxydimethylsilane (J. Appl. Polym. Sci. 2015, DOI: 10.1002/APP.41287). In order to obtain dimethyldichlorosilane, the authors allow aromatic and aliphatic acid chlorides and para-toluenesulfonyl chloride to act on α,ω-dihydroxypolydimethylsiloxanes at temperatures of 170 to 190° C. under iron salt catalysis. The yields of dimethyldichlorosilane are very modest in most of the reaction system is presented and are in the range from <1% to 62% (Table I, ibid.); solely the reaction system consisting of α,ω-dihydroxypolydimethylsiloxane (chain length N=7), 7.5 mol % of iron(III) fluoride and 3 equivalents of benzoyl chloride, based on each dimethylsiloxy unit used, gives dimethyldichlorosilane in 86% yield after treatment at 190° C. for five hours.

Apart from the fact that depolymerization of silicones to give chlorosilane species is undesirable from the point of view of the environment, handling and avoidance of waste, which is especially true of chemical companies that do not implement the Müller-Rochow synthesis themselves, the use of carbonyl chlorides makes the process costly and uneconomic. Moreover, the amount of iron(III) fluoride required is considerable and is already 41 g per 550 g of the α,ω-dihydroxypolydimethylsiloxane used.

The same literature reference (page 5 ff.) also describes the option of depolymerizing α,ω-dihydroxypolydimethylsiloxanes (chain length N=7) with acetic anhydride under iron salt catalysis within the temperature range between 140° C. and 180° C. and with a reaction time of 16 hours. A pressure tube is used here. An experiment with 2.5 mol % of iron(III) chloride, 2 equivalents of acetic anhydride, based in each case on every dimethylsiloxy unit used, at 160° C.

results in a 51% yield of diacetoxydimethylsilane as well as fractions of polydimethylsiloxane cycles such as $D_4$ and $D_6$.

The yield is modest for industrial purposes, and the use of quite a large amount of highly corrosive iron halide is additionally unattractive since most chemical reactors are manufactured from highly alloyed stainless steels and not from Hastelloy®, for example.

Apparently even further removed from industrial implementation are the efforts described in the same reference, with the aid of an autoclave, to depolymerize $\alpha,\omega$-dihydroxypolydimethylsiloxanes (chain length N=7) in an excess of methanol, under iron salt catalysis (Fe(III) fluoride) and with addition of 3.0 equivalents of poly(propylene carbonate), based on each dimethylsiloxy unit used, at reaction temperature 180° C. over the course of 24 hours to give the desired dimethoxydimethylsilane. Dimethoxydimethylsilane is formed here in only an 18% yield alongside 14% propane-1,2-diol and 32% propylene carbonate.

A further route to physical recycling of silicones, specifically silicone oil, is described by Enthaler et al. in ACS Sustainable Chemistry & Engineering 3(1), 2015, pages 163-169. The authors use the reagent boron trifluoride etherate in order to obtain difluorodimethylsilane and 1,3-difluoro-1,1,3,3-tetramethyldisiloxane in moderate yields proceeding from an $\alpha,\omega$-dihydroxypolydimethylsiloxane containing only 7 D units, for example, and then to convert the products to an $\alpha,\omega$-dihydroxypolydimethylsiloxane under the action of an aqueous sodium hydroxide solution. Factors to the discredit of this process in terms of industrial practice are not least the handling of the costly boron reagent and of fluorides which, as the authors speculate, would be suitable for recycling boron trifluoride.

Enthaler et al., in Eur. J. Lipid Technol. 2015, 117, 778-785, report experiments on the iron-catalysed depolymerization of poly(dimethylsiloxanes) with hexanoic anhydride at 200° C. over a period of 24 hours. The authors observe that this method converts silicone oils in good yields to the corresponding short-chain silicone bodies bearing hexanoxy functions, but finds its limit where high molecular weight end-of-life silicones are used, for example those as used for baking trays.

As enriching as these academic contributions to the understanding of the degradation mechanisms involved therein are, it can be stated that there is a lack of an industrially feasible and attractive route for physically recycling both silicone oils and solid silicones.

WO 2014/130948 A1 teaches a process for reutilization of silicone wastes from a mixture with organic polymer and a depolymerization catalyst, wherein this mixture is heated at least to such a degree that at least some of the silicone used is converted to a cyclosiloxane and a residue, and the cyclosiloxane is removed from the heated matrix in an outgassing operation. The examples in this patent specification illustrate that the technical complexity involved in obtaining siloxane cycles is considerable since the depolymerization is first undertaken in a first step in an arrangement composed of two communicating screw extruders at high temperatures and with application of an auxiliary vacuum, before the residue originating from the first step is then depolymerized further in a second step in equipment including a stirrer at temperatures up to 260° C. and with application of an auxiliary vacuum.

SUMMARY

In view of this prior art, the problem addressed is that of finding a simple process that enables the recycling of silicones. Surprisingly, the inventors have now been able to provide a process that enables this and permits transformation both of silicone rubber and of silicones to reactive siloxanes and/or silanes, and the easy processing thereof, for example, to give silanes and/or siloxanes bearing alkoxy groups and/or silanes and/or siloxanes bearing hydroxyl groups. It has been found that, surprisingly, not just silicone oils but also solid silicone rubbers can be converted to siloxanes and/or silanes bearing reactive acetoxy groups in a value-creating manner by subjecting them to a heat treatment in digestion systems, in each case with addition of acetic acid.

DETAILED DESCRIPTION

Against this background, the present invention provides a process for recycling silicones, especially silicone rubber and/or silicone oils, by the chemical transformation thereof to siloxanes and/or silanes having acetoxy groups, wherein the silicones to be recycled are subjected to a heat treatment in digestion systems comprising acetic anhydride and/or acetoxysiloxane, and at least one Brønsted acid, preferably with addition of acetic acid.

In a particularly preferred embodiment, the process according to the invention is conducted with addition of acetic acid.

In a preferred embodiment of the invention, the digestion system comprises
a) acetic anhydride and Brønsted acid, b) acetic anhydride, siloxane cycles and/or hydroxy-functional siloxanes and Brønsted acid, c) acetoxysiloxane and Brønsted acid, or d) acetoxysiloxane, siloxane cycles and/or hydroxy-functional siloxanes, acetic anhydride and Brønsted acid, preferably with addition of acetic acid in each case.

Preferably in accordance with the invention, Brønsted acids used are protic acids with a pKa of less than −1.30, such as preferably nitric acid, methanesulfonic acid and para-toluenesulfonic acid, preferably protic acids having a pKa of less than −2.90, such as preferably concentrated sulfuric acid, more preferably protic acids having a pKa of less than −4.90, such as preferably the perfluoroalkanesulfonic acids such as heptafluoropropanesulfonic acid, pentafluoroethanesulfonic acid, trifluoromethanesulfonic acid, then perchloric acid and chlorosulfonic acid, with preference among these especially for perfluoroalkanesulfonic acids, and very particular preference here for trifluoromethanesulfonic acid, and additionally also preferably sulfonic acid or perfluoroalkylsulfonic acid ion exchange resins, for example in the form of the commercially available Amberlyst® and Lewatit® products, but also in the form of the perfluoroalkylsulfonic acid resins such as Nafion® (for example the NR 50 type).

The Brønsted acid for use with particular preference in accordance with the invention is a perfluoroalkanesulfonic acid, and most preferably trifluoromethanesulfonic acid.

In the context of the invention, it is possible in principle to recycle all silicones, especially silicone rubber and/or silicone oils. More particularly, this is true of the entirety of the silicones listed in the introductory part of the description. Reference is hereby explicitly made thereto. In a preferred embodiment of the invention, the process according to the invention relates to a process for recycling silicones, especially silicone rubber and/or silicone oils, excluding hexamethyldisiloxane. In a preferred embodiment of the invention, the silicone oils to be recycled are composed of D and M units. In a further preferred embodiment of the invention, the silicones to be recycled have molar masses >236 g/mol.

The process according to the invention for the recycling of silicones can impressively be demonstrated by the digestion of a high-quality silicone hose (Example 1).

This inventive digestion of high molecular weight solid silicones is correspondingly also applicable to silicone oils (for example to the polydimethylsiloxanes having end capping by trimethylsilyl groups, Example 2).

Preferably in accordance with the invention, the heat treatment of the silicone oils or of the silicone rubbers in the digestion systems is preferably undertaken between 50° C. and 200° C., more preferably between 80° C. and 160° C., especially between 120° C. and 150° C.

The digestion process according to the invention can advantageously be undertaken at standard pressure (1013 hPa), reduced pressure, or else, in order to achieve high heat treatment temperatures up to 200° C., in pressure-rated apparatuses under elevated pressure. Preferably, the digestion process according to the invention is conducted at standard pressure.

Preferably in accordance with the invention, the Brønsted acid used in the digestion systems is used in amounts advantageously of 0.1 to 1.5 percent by mass, preferably in amounts of 0.15 to 1.0 percent by mass, more preferably in amounts of 0.2 to 0.8 percent by mass, based on the total mass of the respective digestion system.

Preferably in accordance with the invention, acetic acid is added to the digestion systems in amounts of advantageously 0.5 to 4.0 percent by mass, preferably of 1.5 to 3.5 percent by mass, based on the mass of the overall respective digestion system.

If desired, the silanes and/or siloxanes provided with reactive acetoxy functions that are obtained from the process according to the invention may be used again as adhesives and sealants, for example, in the form of polymerization-active masses, optionally blended with further crosslinking silanes and/or siloxanes, filled and/or unfilled with fillers.

It will be apparent to the person skilled in the art that the respective nature and chemical composition of the silicone used and intended for the recycling shapes the composition of the siloxanes containing acetoxy groups that are obtained by the process according to the invention. If, for example, trimethylsilyl units are present in the precursor material, the presence thereof also leads to formation of trimethylsilyl acetate (cf. Ex. 2, silicone oil).

Thus, the process according to the invention, in its configuration directed to the recycling of polydimethylsilicone oils, even constitutes an attractive synthetic alternative route to trimethylsilyl acetate. Trimethylsilyl acetate is a silylating reagent that plays a major role in protecting group chemistry, especially in the synthesis of natural products and of pharmaceutically active molecules. The importance of the trimethylsilyl protecting group is shown, for example, by Oppolzer in U.S. Pat. No. 4,328,353 in the synthesis of norpatchoulenol.

In a preferred embodiment of the invention, the digestion system comprises acetic anhydride. The amount of acetic anhydride advantageously used here is guided both by the amount of silicone rubber and/or silicone oils used for the recycling and the desired target structure of the silane/siloxane bearing acetoxy groups (definition of the average chain length desired in each case via the amount of acetic anhydride used based on the amount of the silicone matrix to be recycled).

If the digestion process according to the invention is undertaken in reactors provided with simple stirring and/or mixing aggregates, the procedure, in terms of adding any further reaction constituents, is led solely by the observation of how the reaction matrix (for example consisting of pieces of silicone rubber with liquid), which in some cases is very heterogeneous at the start of the process, can be mixed with addition of the respective reactants. Such a procedure is illustrated in Example 5.

In the context of the present invention, the term "siloxane containing acetoxy groups" especially also relates to matter containing varying amounts of silanes having acetoxy groups, for example trimethylsilyl acetate, diacetoxydimethylsilane, etc.

The polymerization behavior of the silanes and/or siloxanes provided with reactive acetoxy groups that have been obtained in accordance with the invention can already be shown in a simple manual experiment by applying a small volume of about 0.5 to 2 ml to a black bakelite cover. Particularly the still Brønsted-acidic acetoxysilanes/siloxanes polymerize very quickly under the influence of air humidity and leave an opaque, white silicone film.

Alternatively, the high reactivity of the acetoxysilanes and/or -siloxanes obtained by the process according to the invention also permits the transformation thereof, for example, to the corresponding alkoxysilanes/siloxanes.

Thus, the present invention further relates to the preparation of alkoxy-substituted silanes and/or siloxanes from the Brønsted-acidic acetoxysilanes and/or -siloxanes obtained in accordance with the invention.

The inventors have established that the still Brønsted-acidic acetoxysilanes and/or -siloxanes obtained by the process according to the invention should first preferably be contacted with a sufficient amount of a base in order to neutralize the Brønsted acid present therein, preferably trifluoromethanesulfonic acid. For example, the amount of potassium acetate (preferably in excess) needed to neutralize the trifluoromethanesulfonic acid present in an acetoxysiloxane in trifluoromethanesulfonic acid solution that has been obtained in accordance with the invention from the digestion of a silicone rubber is added thereto, the salt precipitate is optionally removed, an excess of ethanol is added and the mixture is heated under gentle reflux to 80° C. for 6 hours, before the volatiles are removed. The volatiles here consist in particular of the respective acetic ester of the alcohol used, which, in the case of the volatile alcohols, can then be easily removed by distillation with the excess alcohol. The residue consists of the corresponding siloxane bearing alkoxy groups (in Example 3, siloxane bearing ethoxy groups), as shown by the corresponding $^{29}$Si NMR spectrum.

In this way, the corresponding alkoxysilanes and/or -siloxanes are obtained in a simple manner in accordance with the invention, and these can also be used as polymerization-active masses and in that case preferably as sealants and adhesives with addition of suitable crosslinking catalysts, optionally blended with further crosslinking silanes and/or siloxanes, filled and/or unfilled with fillers and/or pigments.

If, by contrast, the Brønsted acid is not neutralized, the reaction of the still Brønsted-acidic acetoxysiloxane with ethanol, for example, under otherwise identical conditions leads to a mixture consisting of roughly equal proportions of siloxanes bearing ethoxy and hydroxyl groups with chain extension (see non-inventive Comparative Example 4).

The invention thus further provides a process for converting the silanes and/or siloxanes having acetoxy groups that are obtained in the digestion system in accordance with the invention to silanes and/or siloxanes having alkoxy groups, wherein
   a) the Brønsted-acidic acetoxysilane and/or acetoxysiloxane is first contacted with at least an amount of a base sufficient for neutralization of the Brønsted acid,
   b) the resultant salt precipitate is optionally removed,
   c) a 100% to 500%, preferably 150% to 350%, excess of an alcohol based on the acetoxy group equivalent present in the acetoxysilane and/or acetoxysiloxane is added and
   d) the exchange of Si-bonded acetoxy functions for alkoxy radicals is undertaken within the temperature range from preferably 60° C. to 130° C., more preferably from 70° C. to 120° C., within a period of preferably 1 to 10 hours and
   e) the resultant acetic ester is optionally removed by distillation together with the excess alcohol.

Preferably in accordance with the invention, the alcohol used is preferably selected from the group of the $C_1$ to $C_{10}$-alkanols, such as methanol, ethanol, 1-propanol, 2-propanol, isopropanol, 1-butanol, 2-butanol, isobutanol, tert-butanol, pentanols, hexanols, heptanols, octanols, nonanols, decanols, in each case including the isomers thereof,
   and allyl alcohol, 1-hexenol, butynediol, dodecanol, stearyl alcohol, vinyloxybutanol. 2-ethylhexanol, cyclohexanol, benzyl alcohol, ethylene glycol, propylene glycol, di-, tri- and polyethylene glycol, 1,2-propylene glycol, di- and polypropylene glycol, 1,4-butanediol, 1,6-hexanediol, trimethylolpropane, glycerol, pentaerythritol, sorbitol and/or hydroxyl group-bearing compounds based on natural products,
   more preferably polyetherols or phenols, compounds having 1 to 8 phenolic OH functions, such as phenol, alkyl- and arylphenols, bisphenol A and novolaks.

According to the invention, the alcohol is added in a 100% to 500%, preferably 150% to 350%, excess based on the acetoxy group equivalent present in the acetoxysiloxane.

The present invention further provides a process for converting the siloxanes having acetoxy groups that are obtained in the digestion system to siloxanes having hydroxyl groups, wherein these are subjected to a hydrolysis in an alkaline system. It is a particular embodiment of the invention that the hydrolysis is undertaken in an aqueous alkaline system, wherein the base used therein is a hydroxide of the alkali metals and/or of the alkaline earth metals and/or a carbonate and/or hydrogencarbonate of the alkali metals and/or alkaline earth metals. Preferably, the aqueous alkaline system is an aqueous hydrogencarbonate solution. The hydrolysis is conducted preferably at temperatures of ≤90° C., more preferably at temperatures of <50° C., and preferably over a period of at least 2 hours.

A further aspect of the process according to the invention is that the hydrolysis is undertaken in an aqueous alkaline system preferably in such a way that the addition of the base used ensures for the duration of the hydrolysis that the pH of the reaction solution does not fall below 10. In this context, the high reactivity of the acetoxysilanes and/or -siloxanes obtained by the process according to the invention facilitates their simple conversion to the corresponding hydroxy-functional silanes and/or siloxanes (here, for example, to the PDM siloxanes).

From the point of view of complete recycling, the process according to the invention is also particularly attractive in that it permits the simple removal and isolation of the fillers and pigments from the silicone matrices that have been modified with filler and pigments and crosslinked to high molecular weight. After digestion according to the invention has been performed, the fillers and pigments can be separated out in a very simple manner, for example by settling, filtration, centrifugation, etc. (filtration in Example 5, recycling of a white joining compound).

The present invention thus further provides for removing of the fillers present in the silicones to be recycled, especially in the silicone rubbers to be recycled, at the end of the digestion by settling, and/or filtration and/or centrifugation.

EXAMPLES

Unless explicitly stated otherwise, all percentages used here should be understood as figures in percent by mass. In the context of the present invention the $^{29}$Si NMR samples are analysed at a measurement frequency of 79.49 MHz in a Bruker Avance III spectrometer equipped with a 287430 sample head with gap width of 10 mm, dissolved at 22° C. in $CDCl_3$, and against a tetramethylsilane (TMS) external standard [$\delta(^{29}Si)=0.0$ ppm].

Example 1

Inventive

An opaque silicone hose (from Büchi, article number: 048355) of external diameter 9 mm and internal diameter 6 mm was cut into pieces of irregular geometry of average size about 3 to 4 mm. In a 500 ml four-neck flask provided with precision glass stirrer and a reflux condenser on top, 50 g of these silicone pieces are heated to 130° C. together with 50 g of decamethylcyclopentasiloxane and 12.5 g of acetic anhydride, 3.7 g of acetic acid and 0.23 g of trifluoromethanesulfonic acid for 6 hours. After only about 45 minutes, the reaction mixture is an opaque, homogeneous liquid without any noticeable solid components.

After the reaction mixture has been cooled, a $^{29}$Si NMR spectrum is recorded, which is characteristic of a linear α,ω-diacetoxypolydimethylsiloxane in all its typical signal positions.

Example 2

Inventive

A silicone oil (polydimethylsiloxane of average chain length N=50) is subjected to a heat treatment at 130° C. in a digestion system consisting of acetic anhydride (4.6 mol based on 1 mol of the polydimethylsiloxane), acetic acid (3.0 percent by mass based on the overall mixture) and trifluoromethanesulfonic acid (0.2 percent by mass based on the overall mixture) for 6 hours. The $^{29}$Si NMR spectrum of the silicone obtained shows that an acetoxy-functionalized siloxane containing proportions of trimethylsilyl acetate (originating from the trimethylsilyl end groups of the silicone oil) has formed.

Example 3

Inventive

To 30 g of the linear α,ω-diacetoxydimethylsiloxane in trifluoromethanesulfonic acid solution obtained in Ex. 1 in a 100 ml three-neck flask with magnetic stirrer, internal thermometer and reflux condenser on top is added 0.20 g of solid potassium acetate while stirring. Then 14.7 ml of technical grade ethanol (99%, 300% stoichiometric excess) is added and the mixture is heated to 80° C. for a duration of 6 hours, such that a gentle reflux is always established. After the reaction mixture has been cooled and the precipitated salt filtered off, the volatiles consisting of ethyl acetate and excess alcohol are removed on a rotary evaporator. The residue consists of the corresponding siloxane bearing ethoxy groups, as demonstrated by the corresponding $^{29}$Si NMR spectrum.

Example 4

Inventive

To 30 g of the linear α,ω-diacetoxydimethylsiloxane in trifluoromethanesulfonic acid solution obtained in Ex. 1 in a 100 ml three-neck flask with magnetic stirrer, internal thermometer and reflux condenser on top is added 14.7 ml of technical grade ethanol (99%, 300% excess) while stirring, and the mixture is heated to 80° C. for a duration of 6 hours such that a gentle reflux is always established. After the reaction mixture has been cooled, the volatiles consisting of ethyl acetate and excess alcohol are removed on a rotary evaporator. The residue consists of a mixture composed of roughly equal proportions of siloxanes bearing ethoxy and hydroxyl groups, which shows a chain extension based on the acetoxysilane used, as demonstrated by the corresponding $^{29}$Si NMR spectrum.

Example 5

Inventive 30 g of a fully cured silicone joining compound provided with white filler (MEM universal silicone, indoor+outdoor, article number 308226) is first cut into pieces of irregular geometry of average size around 3 to 4 mm and then 70 g of decamethylcyclopentasiloxane, 12.5 g of acetic anhydride, 3.7 g of acetic acid and 0.69 g of concentrated sulfuric acid are added thereto in a 500 ml four-neck flask provided with precision glass stirrer, internal thermometer and reflux condenser on top. While stirring, the reaction matrix is heated to 130° C. and the now fully liquefied reaction mixture is contacted after 30 minutes with a further portion (40 g) of the fully cured white silicone joining compound cut into pieces beforehand.

After two hours at 130° C., the reaction mixture takes on such a great viscosity that a further amount of acetic anhydride (12.5 g) is added.

After a further 6 hours at 130° C. and cooling to 100° C., 2.76 g of potassium acetate is introduced to neutralize the sulfuric acid. With further constant stirring, the mixture is allowed to cool down to 25° C. and the solids are separated off with the aid of a filter press (Seitz K300 filter disc). 38.5 g of a white filter residue are isolated here.

A $^{29}$Si NMR spectrum of the pale yellowish, clear filtrate is recorded, which is characteristic of a linear α,ω-diacetoxypolydimethylsiloxane in all its typical signal positions.

Example 6

Inventive

Further Processing of the Siloxane Containing Acetoxy Groups Obtained in Example 5 to Give a Siloxane Bearing Hydroxyl Groups A 500 ml four-neck flask with precision glass stirrer, internal thermometer and reflux condenser on top is charged with 100 g of distilled water together with 1.0 g of sodium hydrogencarbonate (NaHCO$_3$) at 25° C. while stirring. 100 g of the clear filtrate from Example 5 is added rapidly thereto (gentle foaming) and a total of 17.2 g of sodium hydrogencarbonate is added in portions, and it is checked with the aid of moist universal indicator paper that the reaction matrix has a pH of about 10. Thereafter, the mixture is heated to 80° C. for the duration of 6 hours.

After the mixture has been cooled, the alkaline aqueous phase is separated from the silicone phase with the aid of a separating funnel. The silicone phase is dried over sodium sulfate. A $^{29}$Si NMR spectrum recorded thereon demonstrates by its typical signal positions that a linear α,ω-dihydroxypolydimethylsiloxane has formed.

Example 7

Inventive

Digestion of a Red-Colored Silicone Baking Tray 90 g of a red/orange-colored silicone baking tray (muffin baking tray, from TEDI, article number 9152704105100000000) that has been cut into pieces of irregular geometry of average size around 3 to 4 mm is heated in a 500 ml four-neck flask with precision glass stirrer, internal thermometer and reflux condenser on top and heated to 120° C. together with 160 g of decamethylcyclopentasiloxane, 12.5 g of acetic anhydride and 0.5 g of trifluoromethanesulfonic acid while stirring.

All silicone pieces have dissolved completely after only about one hour. The mixture is left to cool and a sample is taken, the corresponding $^{29}$Si NMR spectrum of which is characteristic of a linear α,ω-diacetoxypolydimethylsiloxane in all typical signal positions.

The invention claimed is:

1. A process for recycling silicones, by the chemical transformation thereof to silanes and/or siloxanes having acetoxy groups, wherein the silicones to be recycled are subjected to a heat treatment in digestion systems comprising acetic anhydride and/or acetoxysiloxane, and at least one Brønsted acid, with addition of acetic acid.

2. The process according to claim 1, wherein the digestion system comprises
   a) acetic anhydride and Brønsted acid,
   b) acetic anhydride, siloxane cycles and/or hydroxy-functional siloxanes and Brønsted acid,
   c) acetoxysiloxane and Brønsted acid, or
   d) acetoxysiloxane, siloxane cycles and/or hydroxy-functional siloxanes, acetic anhydride and Brønsted acid.

3. The process according to claim 1, wherein Brønsted acids used are protic acids with a pKa of less than −1.30.

4. The process according to claim 1, wherein the Brønsted acid used in the digestion systems is used in amounts of 0.1 to 1.5 percent by mass, based on the total mass of the respective digestion system.

5. The process according to claim 1, wherein acetic acid is added to the digestion system in amounts of 0.5 to 4.0 percent by mass, based on the total mass of the respective digestion system.

6. The process according to claim 1, wherein the heat treatment in the digestion system is performed at standard pressure (1013 hPa), elevated pressure or reduced pressure.

7. The process according to claim 1, wherein the heat treatment in the digestion system is undertaken within the temperature range from 50° C. to 200° C.

8. The process for conversion of the silanes and/or siloxanes having acetoxy groups that are obtained in the digestion system according to claim 1 to silanes and/or siloxanes having alkoxy groups, wherein
- a) the Brønsted-acidic acetoxysilane and/or acetoxysiloxane is first contacted with at least an amount of a base sufficient for neutralization of the Brønsted acid,
- b) the resultant salt precipitate is removed,
- c) a 100% to 500%, excess of an alcohol based on the acetoxy group equivalent present in the acetoxysilane and/or acetoxysiloxane is added and
- d) the exchange of Si-bonded acetoxy functions for alkoxy radicals is undertaken within the temperature range from preferably 60° C. to 130° C., within a period of from 1 to 10 hours and
- e) the resultant acetic ester is removed by distillation together with the excess alcohol.

9. The process according to claim 8, wherein the alcohol used is selected
from the group of the $C_1$ to $C_{10}$-alkanols.

10. The process for converting the silanes and/or siloxanes having acetoxy groups that are obtained in the digestion system according to claim 1 to silanes and/or siloxanes having hydroxyl groups, wherein these are subjected to a hydrolysis in an alkaline system, in which the base used is a hydroxide of the alkali metals and/or of the alkaline earth metals and/or a carbonate and/or hydrogencarbonate of the alkali metals and/or alkaline earth metals.

11. The process according to claim 10, wherein the alkaline system is an aqueous hydrogencarbonate solution.

12. The process according to claim 10, wherein the hydrolysis is conducted at temperatures of ≤90° C., over a period of at least 2 hours.

13. The process according to claim 12, wherein the hydrolysis is undertaken in an aqueous alkaline system in such a way that the addition of the base used ensures for the duration of the hydrolysis that the pH of the reaction solution does not fall below 10.

14. The process according to claim 1, wherein the fillers and/or pigments present in the silicones to be recycled, in the silicone rubbers to be recycled, are removed at the end of the digestion by settling, and/or filtration and/or centrifugation.

15. The process according to claim 1, wherein Brønsted acids are selected from the group consisting of nitric acid, methanesulfonic acid and p-toluenesulfonic acid.

16. The process according to claim 1, wherein Brønsted acids are protic acids with a pKa of less than −4.90.

17. The process according to claim 1, wherein the Brønsted acid used in the digestion systems is used in amounts of 0.15 to 1.0 percent by mass, based on the total mass of the respective digestion system including acetic acid added.

18. The process according to claim 1, wherein acetic acid is added to the digestion system in amounts of 1.5 to 3.5 percent by mass, based on the total mass of the respective digestion system.

19. The process according to claim 1, wherein the heat treatment in the digestion system is performed at standard pressure (1013 hPa).

20. The process according to claim 1, wherein the heat treatment in the digestion system is undertaken within the temperature range from 120° C. to 150° C.

* * * * *